United States Patent [19]

de Meij

[11] Patent Number: 4,563,145

[45] Date of Patent: Jan. 7, 1986

[54] ALTERNATELY HEATABLE AND COOLABLE MOULDING BLOCK

[75] Inventor: Johannes P. de Meij, Eindhoven, Netherlands

[73] Assignee: U.S. Philips Corporation, New York, N.Y.

[21] Appl. No.: 682,230

[22] Filed: Dec. 17, 1984

[30] Foreign Application Priority Data

Dec. 22, 1983 [NL] Netherlands .......................... 8304399

[51] Int. Cl.[4] ............................................. B29C 35/08
[52] U.S. Cl. ................... 425/174.8 R; 249/78; 425/385; 425/407; 425/810; 425/DIG. 13
[58] Field of Search ................. 249/78; 425/174.8 R, 425/174.8 E, 384, 385, 407, DIG. 13, 810; 264/106, 107

[56] References Cited

U.S. PATENT DOCUMENTS 3,593,376  7/1971  Kisker ................................ 425/384
3,932,097  1/1976  Press ................................... 425/810

Primary Examiner—Willard E. Hoag
Attorney, Agent, or Firm—Robert T. Mayer; Algy Tamoshunas

[57] ABSTRACT

An alternately heatable and coolable moulding block for manufacturing plate-shaped information carriers from thermoplastic material, which block is composed of a plate of an electrically insulating material which has a thin metal mould containing the information and in which plate a duct for a cooling liquid is provided and of an electrical conductor wound to form a flat induction coil. Between the mould and the insulating plate, there are provided a layer of a material of good thermal conductivity, which layer is in contact with the mould, and a layer of a ferromagnetic material.

4 Claims, 1 Drawing Figure

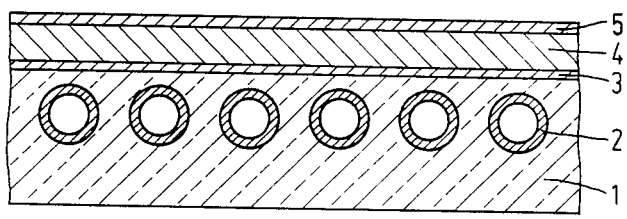

ALTERNATELY HEATABLE AND COOLABLE MOULDING BLOCK

The invention relates to an alternately heatable and coolable moulding block for manufacturing a plate-shaped information carrier from thermoplastic material, the block comprising a plate of an electrically insulating material which carries a metal mould containing the information and in which plate a duct for a cooling liquid is provided and electrical conductor wound to form a flat induction coil.

A moulding block of the kind to which the present invention relates is described in DE-OS No. 27 47 797. Such moulding blocks are used in the manufacture of audio- or video-information carriers by injection-moulding or moulding by casting. First a hot mould is required for providing the information, and shortly there after this mould has to be cooled rapidly. From the point of view of energy efficiency it is important to keep the mass of the mould which has to be periodically heated and cooled as small as possible. When inductively heating the mould, which may be constituted by a more or less thermally insulated metal foil, in principle a small mass is heated. With inductive heating by means of a flat coil at a certain distance from the mould, as in the case of the moulding block according to the aforementioned DE-OS No. 27 47 797, the problem arises that with a small distance between coil and mould a nonuniform heating of the mould is obtained. The form of the coil returns as a heating pattern in the mould. This adversely affects the quality of the information carrier produced. With a larger distance between coil and mould, the heating is spread more uniformly but nevertheless the centre will be hotter than the edges, while moreover the efficiency strongly decreases by a poorer coupling-in of energy.

The invention has for its object to provide a moulding block in which a uniform heating of the mould is obtained with a high energy efficiency.

The moulding block according to the invention is characterized in that between the mould and the insulating plate there are provided a layer of a material of good thermal conductivity, which layer is in contact with the mould and a layer of an electrically conductive ferromagnetic material. In the moulding block according to the invention the heat production will now take place in the said ferromagnetic layer. The heat produced is transferred by the thermally conductive layer to the mould, while any temperature differences are eliminated.

According to a favourable embodiment of the invention, the electrical conductor is constituted by a metal wall of the cooling duct. The cooling duct may then be formed by, for example, a copper pipe embedded in a plate of an electrically insulating material, such as glass or synthetic material.

In a favourable embodiment of the moulding block the ferromagnetic layer has a thickness of 100 $\mu$m, while the thermally conducting layer has a thickness of 500 $\mu$m. The thickness of the ferromagnetic layer depends upon the frequency of the current used a higher frequency the thickness may be smaller and at a lower frequency the thickness may be somewhat larger. The thickness of the thermally conductive layer is connected with the extent to which temperature equalization of the mould is required. The material of the thermally conductive layer may be copper.

The invention will be described more fully with reference to the drawing.

In the drawing a portion of a moulding block for manufacturing a plate-shaped information carrier is shown diagramatically by way of example. This moulding block comprises a base plate 1 of glass. Alternatively, the plate 1 may be made of another electrically insulating material. A copper pipe 2 is embedded in the material of the plate 1. The copper pipe can be connected to a supply (not shown) of cooling water. The copper pipe 2 is wound to form a flat induction coil and its wall can be connected to a voltage source (not shown) of alternating high-frequency voltage.

A layer 3 of a ferromagnetic material, such as iron is arranged in contact with the base plate 1. The thickness of the layer 3 is 100 $\mu$m. On the side remote from the base plate 1 the layer 3 is in contact with a layer 4 of a material of good thermal conductivity such as copper. A mould 5 containing the information is arranged in contact with the layer 4.

In this manner, a moulding block is obtained in which, when current is passed through the wall of the pipe 2, inductive heat production takes place in the layer 3. The heat image in the layer 3 will still exhibit the configuration of the coil formed by the pipe 2, that is to say, there are local heat differences. The heat produced is now transferred through the layer 4 to the mould 5, and due to the fact that the heat conduction acts both at right angles to the layers and in the layers, a good temperature equalization takes place. The result is a uniform temperature of the mould 5.

A moulding block of the kind described here can be used both in moulding by casting and in an injection-moulding process.

Two of these moulding blocks with their moulds facing each other can be arranged in a press so that moulding can be carried out from two sides.

What is claimed is:

1. An alternately heatable and coolable moulding block for manufacturing a plate-shaped information carrier from thermoplastic material, the block comprising a plate of an electrically insulating material which carries a metal mould containing the information and in which plate a duct for a cooling liquid is provided, and an electrical conductor wound to form a flat induction coil, charactrerized in that between the mould and the insulating plate there are provided a layer of a material of good thermal conductivity, which layer is in contact with the mould, and a layer of an electrically conductive ferromagnetic material.

2. A moulding block as claimed in claim 1, characterized in that the electrical conductor is constituted by the wall of the cooling duct.

3. A moulding block as claimed in claim 1, characterized in that the layer of ferromagnetic material has a thickness of 100 $\mu$m and the thermally conductive layer has a thickness of 500 $\mu$m.

4. A moulding block as claimed in claim 1, 2 or 3, characterized in that the thermally conductive layer is made of copper.

* * * * *